No. 658,476. Patented Sept. 25, 1900.
I. E. STOREY.
DYNAMO REGULATION.
(Application filed Feb. 23, 1900.)
(No Model.)
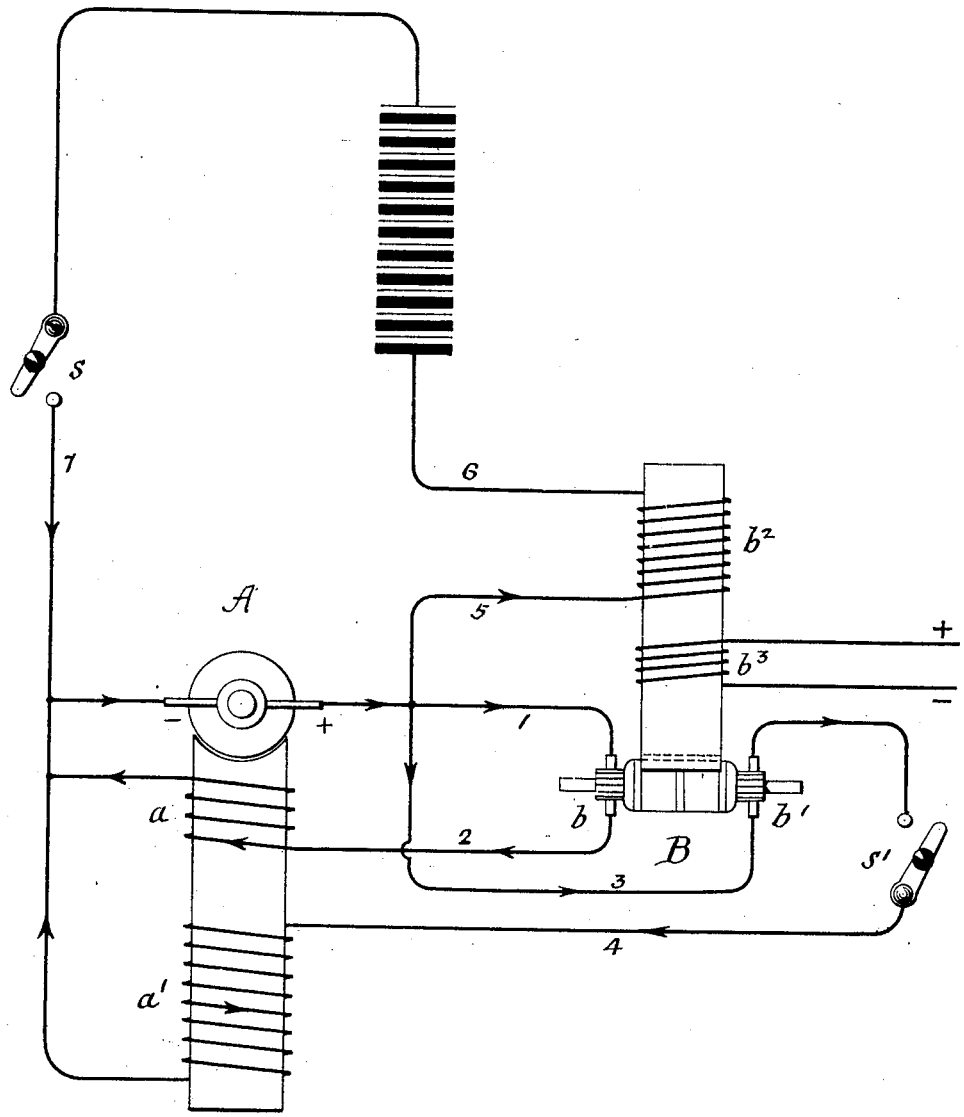

UNITED STATES PATENT OFFICE.

IMLE E. STOREY, OF TRENTON, NEW JERSEY.

DYNAMO REGULATION.

SPECIFICATION forming part of Letters Patent No. 658,476, dated September 25, 1900.

Application filed February 23, 1900. Serial No. 6,196. (No model.)

*To all whom it may concern:*

Be it known that I, IMLE E. STOREY, a citizen of the United States, residing at Trenton, in the county of Mercer and State of New Jersey, have invented certain new and useful Improvements in Dynamo Regulation, of which the following is a full, clear, and exact description.

My invention relates to the regulation of variable-speed electric generators to maintain a substantially-constant voltage, and has particular reference to generators driven from the axle of a railway-car. In such service it is well understood that the speed is subjected to wide variations and to maintain a constant pressure on the circuit requires very sensitive and quick-acting mechanism.

In carrying out my invention I provide a generator having two coils or sets of coils on its field-magnet, one of which is the regular exciting-coil, while the other is an opposing coil, the function of which is to neutralize the effect of the exciting-coil. In conjunction with such a generator I use an electric machine driven as a motor by current from the dynamo and whose armature carries coils independent of the motor-coils, in which a current is generated and separately commutated. The exciting-coil on the field-magnet of the generator is in a shunt to the brushes of the generator, which also includes the motor-armature, while the opposing coil on the field-magnet of the generator is in a similar but separate shunt, which includes those coils on the motor-armature in which current is generated, such generated current augmenting that which ordinarily is shunted from the brushes of the main generator and which is sent through the opposing coil in the proper direction to create an opposing magnetism in the field. The field-magnet of the motor is in the main circuit of the generator.

The system is illustrated in the accompanying drawing, in which the figure is a conventional representation of the main generator, motor-dynamo, and circuits.

A indicates the main generator, supposed to be driven at variable speed. Its field-magnet carries an exciting-coil $a$ and an opposing coil $a'$ of a comparatively-large number of turns.

B is a motor-dynamo having the usual two commutators $b$ and $b'$, the former connected with the motor-coils on the armature and the latter with the generator-coils thereon. The field-magnet coil $b^2$ of the motor-dynamo is in the main circuit of the main generator, which circuit also includes a storage battery, as shown, or lights or other translating devices. The field-magnet of the motor-dynamo may have a few turns of wire $b^3$ in circuit with a battery or other source to insure a field in starting, if necessary.

A shunt-circuit 1 2 from the main generator includes the motor-armature represented by commutator $b$ and the exciting-coil $a$, while another shunt-circuit 3 4 includes the dynamo-armature represented by commutator $b'$ and the opposing coil $a'$. The main circuit is indicated by 5 6 7 and, as before stated, includes the motor-dynamo field-coil $b^2$. The main circuit and the circuit 3 4 contain switches $s$ and $s'$, respectively, which may be either hand or automatic devices.

The main generator is started with both switches open. Current flowing in shunt-circuit 1 2 and the coil $b^3$ starts the motor-armature, whose speed runs high, owing to the weak magnetic field. When the voltage of the main generator rises sufficiently to charge the battery or supply other translating devices in the main circuit, both switches $s$ $s'$ are closed, whereupon the strong field, which is immediately built up in the machine B, due to the excitation of its field-magnet coil, generates current in those coils of the armature connected with commutator $b'$, which current flows in the opposing coil and augments the current in that coil flowing from the main generator. Since this current in the coil $a'$ opposes that flowing in the coil $a$, the electromotive force of the main generator will be lowered in proportion to the electromotive force in the main circuit 5 6 7, which includes the field-magnet of machine B. Any increase of speed of the machine A will increase the lines of force in the machine B, which are cut by the coils connected to commutator $b'$, so that there will necessarily be an automatic regulation of the voltage of the machine A.

The action of the generator-coils in the machine B, as described, is similar to that of a "booster" in that it increases the current on the circuit 3 4 beyond that which would ordinarily flow in it from the brushes of the main dynamo; but this generating-circuit of machine B is not necessarily connected in shunt to the generator A, as good results can be obtained by connecting the opposing coil exclusively with the generating-circuit of the B machine.

Having described my invention, I claim—

1. The combination of a main generator adapted to be driven at a variable speed and having on its field-magnet an exciting-coil and an opposing coil, a dynamo-electric machine whose field-magnet is energized by said generator and whose armature is connected with said opposing coil, substantially as described.

2. The combination of a main generator of electricity adapted to be driven at a variable speed and having on its field-magnet an exciting-coil and an opposing coil, a dynamo-electric machine whose field-magnet is energized by said main generator and whose armature is in a shunt-circuit from said main generator which includes said opposing coil, substantially as described.

3. The combination of a main generator adapted to be driven at a variable speed and provided on its field-magnet with an exciting-coil and an opposing coil, a motor-dynamo whose field-magnet is connected in the main circuit of the generator and whose two armature-circuits are connected respectively in shunts of the main generator which include said exciting and opposing coils thereon, substantially as described.

In witness whereof I subscribe my signature in presence of two witnesses.

IMLE E. STOREY.

Witnesses:
WM. A. ROSENBAUM,
CLARENCE E. ACKERLY.